US012664877B2

(12) United States Patent　(10) Patent No.: US 12,664,877 B2
Hirata et al.　(45) Date of Patent: Jun. 23, 2026

(54) MONITORING DEVICE, MONITORING METHOD, AND RECORDING MEDIUM

(71) Applicant: NEC Corporation, Tokyo (JP)

(72) Inventors: Satoshi Hirata, Tokyo (JP); Hajime Yamashita, Tokyo (JP); Genki Yamamoto, Tokyo (JP); Masafumi Shibata, Tokyo (JP); Dai Hashimoto, Tokyo (JP); Takahiro Kimoto, Tokyo (JP); Youhei Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 18/733,956

(22) Filed: Jun. 5, 2024

(65) Prior Publication Data

US 2024/0321084 A1　Sep. 26, 2024

Related U.S. Application Data

(63) Continuation of application No. 17/908,364, filed as application No. PCT/JP2020/014885 on Mar. 31, 2020, now Pat. No. 12,046,128.

(51) Int. Cl.
*G08B 31/00* (2006.01)
*G06V 20/40* (2022.01)
*G06V 40/10* (2022.01)

(52) U.S. Cl.
CPC ............. *G08B 31/00* (2013.01); *G06V 20/44* (2022.01); *G06V 40/10* (2022.01)

(58) Field of Classification Search
CPC ............. G08B 31/00; G08B 13/19602; G08B 25/002; G06V 20/44; G06V 40/10
See application file for complete search history.

(56) References Cited

U.S. PATENT DOCUMENTS

| | | | |
|---|---|---|---|
| 2018/0012462 A1* | 1/2018 | Heitz, III | ............... G06V 40/20 |
| 2018/0012463 A1 | 1/2018 | Chaudhry | ............... G06T 7/246 |
| 2019/0318171 A1 | 10/2019 | Wang | ................ G06F 18/24143 |

FOREIGN PATENT DOCUMENTS

| | | | |
|---|---|---|---|
| EP | 3297277 A1 | 3/2018 | ......... G06K 9/00577 |
| JP | H10-083492 A | 3/1998 | |
| JP | 2006-095039 A | 4/2006 | |
| JP | 2007-251646 A | 9/2007 | |
| JP | 2010-040017 A | 2/2010 | |
| JP | 2015-138460 A | 7/2015 | |
| JP | 2019-087842 A | 6/2019 | |
| JP | 2019-152943 A | 9/2019 | |
| JP | 2020-014109 A | 1/2020 | |
| WO | 2016/194402 A1 | 12/2016 | |

(Continued)

OTHER PUBLICATIONS

International Search Report for PCT Application No. PCT/JP2020/014885, mailed on Jun. 23, 2020.

(Continued)

*Primary Examiner* — An T Nguyen
(74) *Attorney, Agent, or Firm* — Sughrue Mion, PLLC

(57)　ABSTRACT

An appropriate response to an event is recommended to a monitoring person. An event detection unit (12) detects an event based on video data, and an alert unit (13) issues a first alert when a first event is detected, and issues a second alert that is distinguished from the first alert when a second event relating to the first event is further detected in addition to the first event.

6 Claims, 12 Drawing Sheets

(56) References Cited

FOREIGN PATENT DOCUMENTS

| WO | 2019/067424 A1 | 4/2019 |
| WO | 2019/172093 A1 | 9/2019 |

OTHER PUBLICATIONS

English translation of Written opinion for PCT Application No. PCT/JP2020/014885, mailed on Jun. 23, 2020.
JP Office Action for JP Application No. 2022-513018, mailed on Feb. 13, 2024 with English Translation.

* cited by examiner

Fig.5

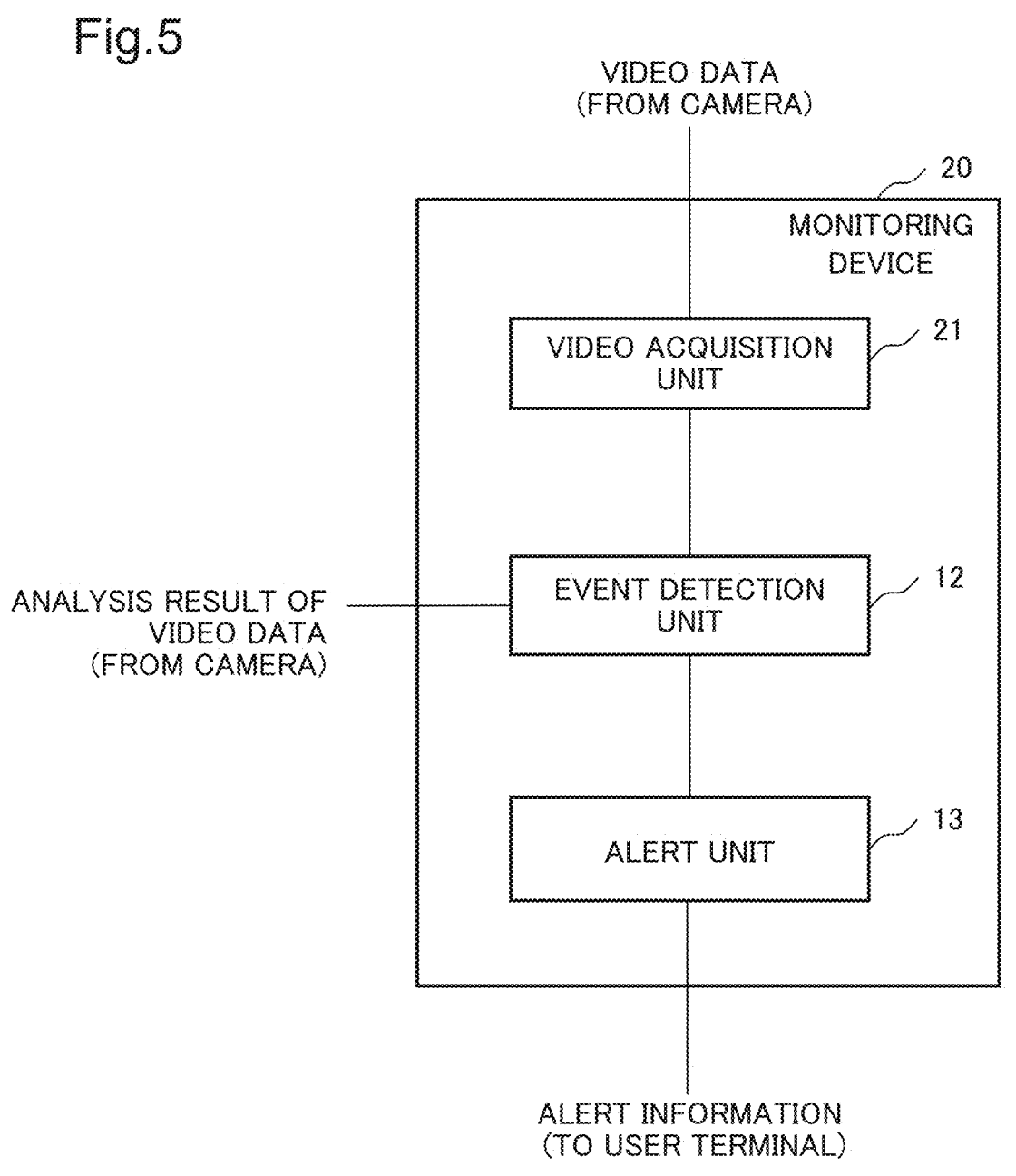

VIDEO DATA
(FROM CAMERA)

20

MONITORING
DEVICE

| VIDEO ACQUISITION UNIT | 21 |

ANALYSIS RESULT OF
VIDEO DATA
(FROM CAMERA)

| EVENT DETECTION UNIT | 12 |

| ALERT UNIT | 13 |

ALERT INFORMATION
(TO USER TERMINAL)

VIDEO DATA
(FROM CAMERA)

30

MONITORING DEVICE

21

VIDEO ACQUISITION
UNIT

32

EVENT DETECTION UNIT

321

FIRST EVENT
DETECTION UNIT

322

SECOND EVENT
DETECTION UNIT

13

ALERT UNIT

ALERT INFORMATION
(TO USER TERMINAL)

MONITORING DEVICE, MONITORING METHOD, AND RECORDING MEDIUM

This application is a Continuation of U.S. application Ser. No. 17/908,364 filed on Aug. 31, 2022, which is a National Stage Entry of PCT/JP2020/014885 filed on Mar. 31, 2020, the contents of all of which are incorporated herein by reference, in their entirety.

TECHNICAL FIELD

The present invention relates to a monitoring device, a monitoring method, and a recording medium, and more particularly to a monitoring device that monitors a monitoring target area by using video data acquired from a camera, a monitoring method, and a recording medium.

BACKGROUND ART

A related technique analyzes video data obtained by photographing a monitoring target area by a monitoring camera (alternatively, it is also referred to as a street camera or a security camera), and detects an unusual behavior of a person different from usual and an event such as a suspicious object based on the analysis result. The monitoring target area is a place where an unspecified large number of people gather, and is, for example, a station, a shopping center, or a downtown. The related technique notifies a monitoring person, such as a police officer or security guard, of an alert when an unusual action or suspicious object is detected. For example, PTL 1 describes that a notification destination of an alert is determined based on a risk level of a detected event.

CITATION LIST

Patent Literature

[PTL 1] JP 2019-152943 A

SUMMARY OF INVENTION

Technical Problem

Generally, a crime or tort occurs when there is an opportunity. For example, when there is a person in sleep, a theft targeting the person in sleep occurs. Therefore, the presence of the person in sleep should be noted by the monitoring person as a precursor or trigger for theft. The related technique described in PTL 1 does not distinguish between a mere insignificant event (for example, there is a person who is taking a break) and a precursor of an event important to the monitoring person (in the above example, there is a person in sleep).

The present invention has been made in view of the above problems, and an object of the present invention is to prompt a monitoring person to take an appropriate response to an event.

Solution to Problem

A monitoring device according to an aspect of the present invention includes: an event detection means configured to detect an event from video data; and an alert means configured to notify a first alert when a first event is detected, and notify a second alert that is distinguished from the first alert when a second event related to the first event is further detected in addition to the first event.

A monitoring method according to an aspect of the present invention is a monitoring method by a monitoring device, including: detecting an event from video data; notifying a first alert when a first event is detected; and notifying a second alert that is distinguished from the first alert when a second event related to the first event is further detected in addition to the first event.

A recording medium according to an aspect of the present invention stores a program for causing a computer to execute: detecting an event from video data; and notifying a first alert when a first event is detected, and notifying a second alert that is distinguished from the first alert when a second event related to the first event is further detected in addition to the first event.

Advantageous Effects of Invention

According to one aspect of the present invention, it is possible to prompt a monitoring person to take an appropriate response to an event.

BRIEF DESCRIPTION OF DRAWINGS

FIG. 5 is a block diagram illustrating a configuration of a monitoring device according to a second example embodiment.

EXAMPLE EMBODIMENT

Common to all Example Embodiments

A configuration applied to any of first to fourth example embodiments described later will be described with reference to FIGS. 1 and 2.

(System 1)

Figure 1:
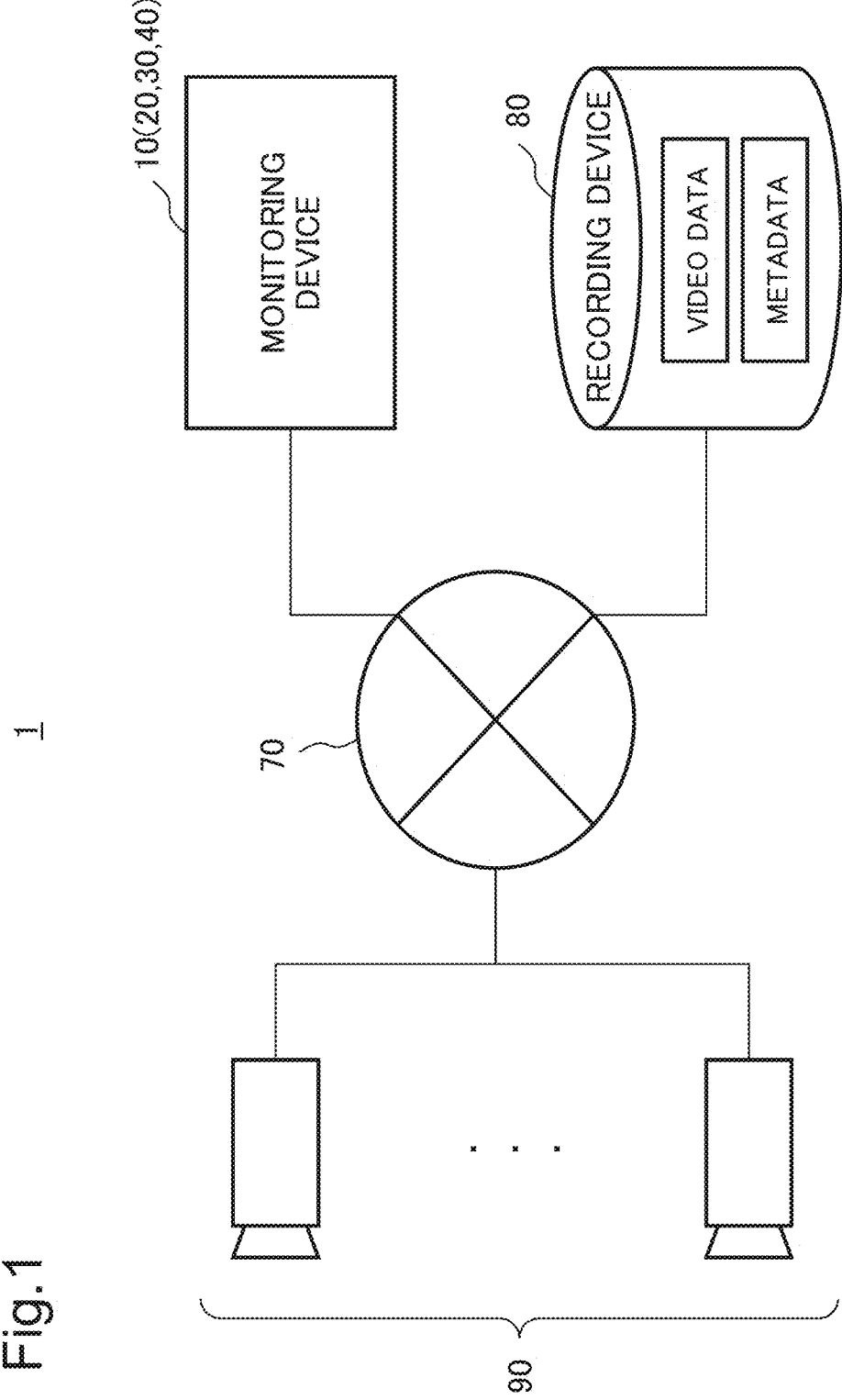
FIG. 1 is a diagram schematically illustrating a configuration of a system including a monitoring device according to any one of first to fourth example embodiments.

FIG. 1 schematically illustrates an example of a configuration of a system 1 according to all example embodiments described below. As illustrated in FIG. 1, the system 1 includes a monitoring device 10, a recording device 80, and one or more cameras 90. In the system 1, the monitoring device 10, the recording device 80, and one or more cameras 90 are communicably coupled via a network 70. The system 1 may include a monitoring device 20, 30, or 40 according to a second, third, or fourth example embodiment instead of the monitoring device 10 according to the first example embodiment.

In one example, the system 1 is used to monitor a predetermined area (referred to as a monitoring target area). In the system 1, the monitoring device 10 analyzes video data obtained by one or more cameras 90 photographing an inside of the monitoring target area. As a result, the monitoring device 10 detects an unusual behavior of a person different from usual and an event such as a suspicious object. One or more cameras 90 accumulates the generated video data, and transmits the accumulated video data to the monitoring device 10 every predetermined time (for example, 30 seconds) or every time an event is detected.

The one or more cameras 90 have a function of detecting a moving object as an event by analyzing video data. More specifically, the one or more cameras 90 detect that a person, a bicycle, an automobile, an animal, and other objects are moving as an event based on a difference between image frames of the video data. However, the camera 90 does not necessarily have a function of detecting an object as an event. For example, in a third example embodiment described later, a camera having the function is not required. Hereinafter, a case where the system 1 includes only one camera 90 (alternatively, only one camera 90 is activated) will be described.

Figure 2:
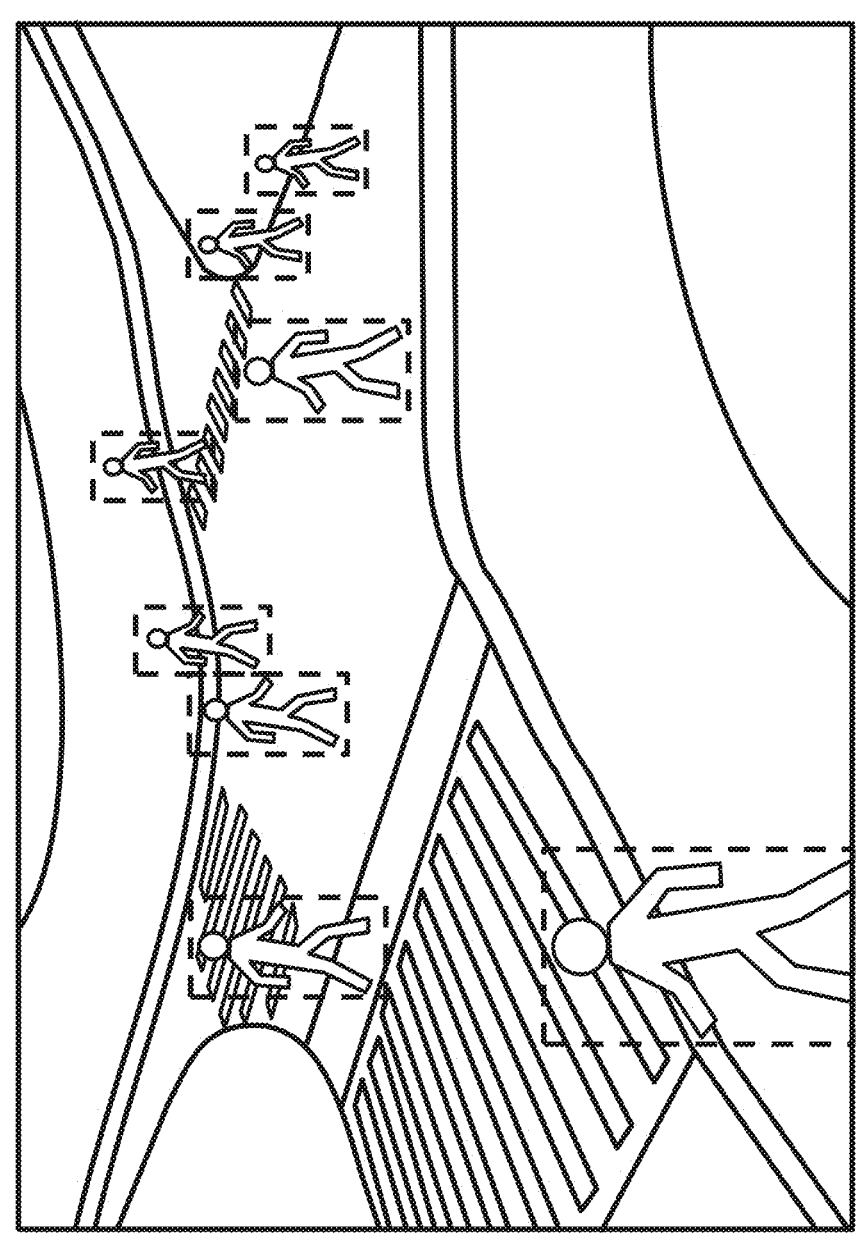
FIG. 2 is an example of one image frame of video data generated by a camera included in a system according to all example embodiments.

FIG. 2 illustrates an example of an image frame of video data generated by the camera 90. In the image frame illustrated in FIG. 2, there are a plurality of persons in an intersection. A rectangle surrounding each person indicates an area of a walking person (an example of the moving object) detected as an event by an analysis unit (not illustrated) of the camera 90.

The analysis unit of the camera 90 transmits information indicating the analysis result of the video data to the monitoring device 10 via the network 70. The camera 90 stores the information indicating the analysis result of the video data in the recording device 80 as metadata related to the video data. The recording device 80 may be included in the monitoring device 10, 20, 30, or 40. [First Example Embodiment]

A first example embodiment will be described with reference to FIGS. 3 and 4.

(Monitoring Device 10)

A configuration of the monitoring device 10 according to the present first example embodiment will be described with reference to FIG. 3. FIG. 3 is a block diagram illustrating a configuration of the monitoring device 10.

Figure 3:
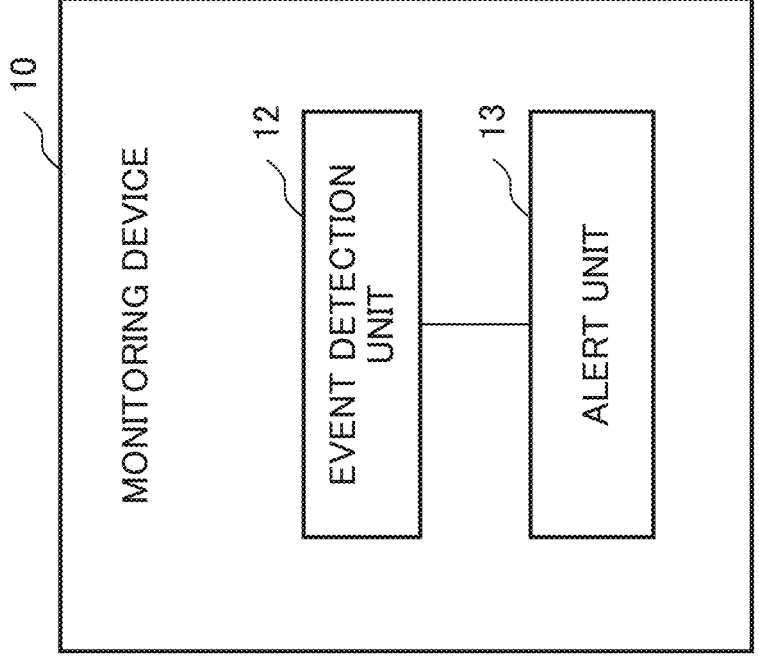
FIG. 3 is a block diagram illustrating a configuration of a monitoring device according to a first example embodiment.

As illustrated in FIG. 3, the monitoring device 10 includes an event detection unit 12 and an alert unit 13.

The event detection unit 12 acquires video data. For example, the event detection unit 12 acquires video data from the camera 90 via the network 70 (FIG. 1). As described above, the video data is obtained by the camera 90 photographing the inside of the monitoring target area.

The event detection unit 12 detects an event from the video data. The event detection unit 12 is an example of an event detection means. In one example, the event detection unit 12 detects a first event and a second event by referring to information indicating an association between the first event and the second event. When the second event is detected, the event detection unit 12 may further detect a third event associated with the first event and the second event from the video data. The information indicating the association between the first event and the second event is stored in, for example, a storage unit (not illustrated) of the monitoring device 10 or the recording device 80 of FIG. 1. Details of generation of information indicating the association between the first event and the second event will be described in a fourth example embodiment described later.

In one example, the event detection unit 12 detects the first event and the second event from the video data by using a learned identifier that identifies an object or a motion related to the first event and the second event. Alternatively, in a case where the first event and the second event are detected from the video data, the event detection unit 12 may use related technologies such as a background difference method and pattern matching. Means and methods for detecting the first event and the second event are not limited.

Figure 4:
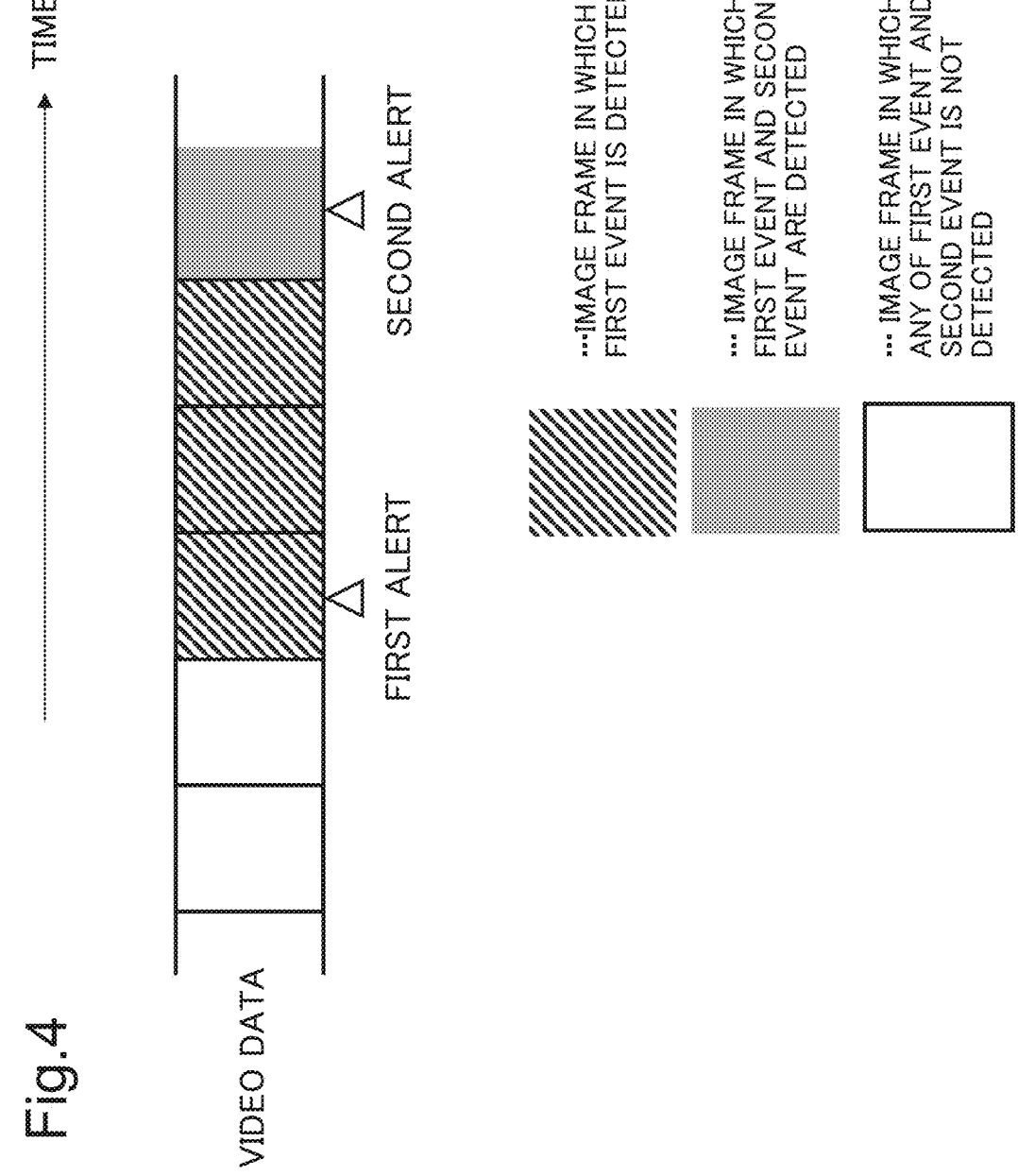
FIG. 4 schematically illustrates an example of video data configured by a plurality of image frames.

FIG. 4 schematically illustrates an example of the video data configured by a plurality of image frames and alert notification. As illustrated in FIG. 4, the event detection unit 12 detects the first event from the video data by analyzing the video data.

Specifically, the event detection unit 12 outputs a flag indicating that the first event is detected in the video data to the alert unit 13. Alternatively, the event detection unit 12 may output information indicating a period during which the first event is detected (in one example, one or a plurality of consecutive image frame numbers in the video data) to the alert unit 13.

In addition to the first event, the event detection unit 12 further detects a second event associated with the first event. For example, the event detection unit 12 further detects the second event from the video data obtained in the period during which the first event is detected. The event detection unit 12 outputs a flag indicating that the second event is detected to the alert unit 13. Alternatively, the event detection unit 12 may output information (in one example, one or a plurality of consecutive image frame numbers in the video data) indicating a period during which the second event is detected to the alert unit 13.

The first event and the second event will be described. Specifically, the second event is an event that a monitoring person should take some response (at least notice) in accordance with the operation. For example, the second event is a person in sleep, a person carrying baggage, a suspicious object being left, gathering or enclosing, or a sudden stop of an automobile.

Specifically, the first event is an event associated with the second event. More particularly, the first event is based on the second event and occurs before and after the second event. More particularly, the first event is an event that is a precursor, factor, trigger, or result (induced event) of the second event. The first event may be an event that lasts for a long time (several minutes or more or several hours or more). For example, when the second event is "sudden stop and stagnation of automobile", the first event is an event that supports "sudden stop and stagnation of automobile" as a traffic violation or a traffic accident. In this example, the first event may be an "overspeed", a "change in vehicle body shape", a "fallen person", a "traffic jam", or a "crowd". In the present first example embodiment, the first event and the second event are associated in advance. However, the monitoring device 10 may also determine the first event associated with the second event (fourth example embodiment as a specific example).

The alert unit 13 notifies a first alert when a first event is detected, and notifies a second alert that is distinguished from the first alert when a second event associated with the first event is further detected in addition to the first event. For example, the alert unit 13 may change a notification sound or a display method (color or the like) between a case where the second event is detected and a case where only the first event is detected (a specific example will be described later). As a result, the user (monitoring person) can distinguish between the first alert and the second alert. FIG. 4 illustrates an example of timings at which the first alert and the second alert are notified. The alert unit 13 is an example of an alert means. Further, when a third event associated with the first event and the second event is detected, the alert unit 13 may notify a third alert of a different aspect from the first alert and the second alert.

In one example, the alert unit 13 is synchronized with a display control unit (not illustrated) of the monitoring device 10. The display control unit acquires the video data from the camera 90, and displays a video based on the video data on a display. In one example, when the display control unit causes the display to display the image frame in which the first event is detected, the alert unit 13 notifies the first alert. When the display control unit causes the display to display the image frame in which the second event is detected, the alert unit 13 notifies a second alert that is distinguished from the first alert. That is, when the first event and the subsequent second event are detected, the alert unit 13 notifies the alert in two stages.

Alternatively, the alert unit 13 may notify the first alert when receiving a flag indicating that the first event is detected from the event detection unit 12. The alert unit 13 may notify the second alert when receiving a flag indicating that the second event is detected from the event detection unit 12. In this case, the alert unit 13 may continue to notify the second alert until it is detected that a surveillance staff has performed a predetermined stop operation. Alternatively, the alert unit 13 may notify the second alert by a timer for a predetermined period.

The first alert and the second alert may be distinguished in such a way that they can be distinguished by the five human senses. For example, when the first alert and the second alert are made by sound, the second alert is distinguished from the first alert by volume or pattern. In this case, the volume or pattern of the second alert and the volume or pattern of the second alert may be distinguishable by human hearing. In another example, when the first alert and the second alert are made by display, the second alert is differentiated from the first alert by color or brightness. In this case, the color or brightness of the second alert and the color or brightness of the second alert may be identifiable by human vision.

(Modification)

In a modification of the present first example embodiment, the analysis unit of the camera 90 has a part of the function of the event detection unit 12. That is, the analysis unit of the camera 90 detects the first event from the video data by analyzing the video data. The alert unit 13 receives the analysis result of the video data by the camera 90, and notifies the first alert based on the detection result of the first event by the camera 90. Here, the analysis result of the video data is, for example, one or more events analyzed by the camera 90 from the video data, and the first event may be included in the events. The detection result of the first event is the first event extracted by the camera 90 from the analysis result. After the first event is detected by the camera 90, the event detection unit 12 detects the second event from the video data. At this time, the alert unit 13 notifies a second alert that is distinguished from the first alert.

According to the configuration of the present modification, the event detection unit 12 may detect at least the second event without detecting the first event. Therefore, a processing amount of the monitoring device 10 can be reduced.

Effects of Present Example Embodiment

According to the configuration of the present example embodiment, the event detection unit 12 detects an event from video data. The alert unit 13 notifies a first alert when a first event is detected, and notifies a second alert that is distinguished from the first alert when a second event associated with the first event is further detected in addition to the first event.

That is, the monitoring device 10 notifies alerts that are distinguished from each other between a case where the first event is detected and a case where the second event is also detected in addition to the first event. In other words, the monitoring device 10 notifies different alerts in two stages when the first event is detected and when the second event is detected. As a result, it is possible to prompt the monitoring person to respond to the event.

Second Example Embodiment

A second example embodiment will be described with reference to FIGS. 5 and 6. Among the components described in the present second example embodiment, the components denoted by the same member numbers as those of the components described in the first example embodiment have the same functions as those of the components described in the first example embodiment.

(Monitoring Device 20)

A configuration of the monitoring device 20 according to the present second example embodiment will be described with reference to FIG. 5. FIG. 5 is a block diagram illustrating a configuration of the monitoring device 20.

As illustrated in FIG. 5, the monitoring device 20 includes a video acquisition unit 21, an event detection unit 12, and an alert unit 13. The video acquisition unit 21 according to the present second example embodiment acquires video data. The event detection unit 12 of the monitoring device 20 receives an analysis result of the video data from the camera 90 (FIG. 1). The analysis result of the video data includes information indicating an event (including the first event) detected from the video data by the camera 90.

The event detection unit 12 receives the analysis result of the video data from the camera 90. The event detection unit 12 refers to information indicating association between the first event and the second event, and extracts (or searches) the detection result of the first event from the analysis result of the video data. In other words, the event detection unit 12 determines whether the event detected by the camera 90 is the first event or another event different from the first event.

The event detection unit 12 detects the second event from the video data obtained in the period during which the camera 90 detects the first event. In one example, the event detection unit 12 detects theft (that is an example of the second event) aiming at the belongings of a person in sleep in a period during which the camera 90 detects a person in sleep (that is an example of the first event). The event detection unit 12 outputs a flag indicating that the second event is detected to the alert unit 13. Alternatively, the event detection unit 12 may output information (for example, consecutive image frame numbers of video data) indicating a period during which the second event is detected to the alert unit 13.

The alert unit 13 is synchronized with a display control unit (not illustrated) of the monitoring device 20. The display control unit outputs the video data acquired by the video acquisition unit 21 to a display, and causes the display to display a video based on the video data. The alert unit 13 receives a flag indicating that the first event is detected from the camera 90. When the image frame in which the first event is detected is displayed on the display, the alert unit 13 notifies the first alert.

Alternatively, the alert unit 13 may notify the first alert when receiving the flag indicating that the first event is detected from the camera 90. When receiving a flag indicating that the second event is detected from the event detection unit 12, the alert unit 13 may notify a second alert that is distinguished from the first alert. In this case, the alert unit 13 may continue to notify the second alert until the surveillance staff performs a predetermined stop operation. Alternatively, the alert unit 13 may notify the second alert for a predetermined period.

(Operation of Monitoring Device 20)

Figure 6:
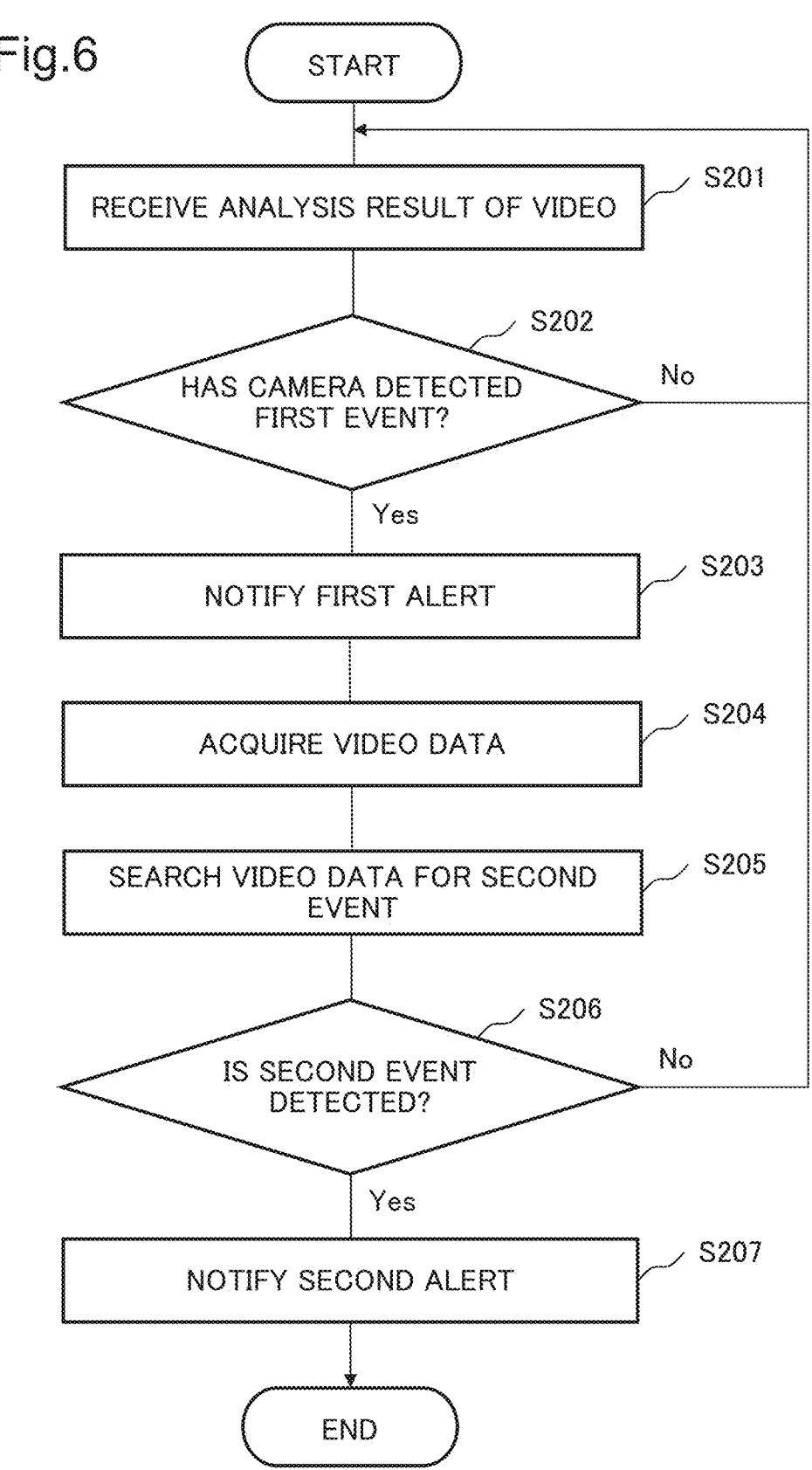
FIG. 6 is a flowchart illustrating a flow of processing executed by each unit of a monitoring device according to a second example embodiment.

FIG. 6 is a flowchart illustrating a flow of processing executed by each unit of the monitoring device 20 according to the present second example embodiment. First, the video acquisition unit 21 acquires video data and metadata.

As illustrated in FIG. 6, the event detection unit 12 receives an analysis result of the video data from the camera 90 (S201).

The event detection unit 12 determines whether the camera 90 has detected the first event based on the analysis result of the video data (S202). In other words, the event detection unit 12 extracts (or searches) the first event from among the events detected by the camera 90.

When the first event is not detected (No in S202), the flow returns to step S201. On the other hand, when the first event is detected (Yes in S202), the event detection unit 12 outputs a flag indicating that the first event is detected to the alert unit 13.

The alert unit 13 notifies the first alert based on the analysis result of the video by the camera 90 (S203). In one example, when the display control unit synchronized with the alert unit 13 causes the display to display the image frame in which the first event is detected, the alert unit 13 notifies the first alert.

Similarly to the event detection unit 12 according to the first example embodiment, the video acquisition unit 21 acquires video data from the camera 90 via the network 70 (S204). The video acquisition unit 21 outputs the video data to the event detection unit 12.

The event detection unit 12 searches the video data for the second event (S205).

When the second event is not detected by the search (No in S206), the flow returns to step S201. On the other hand, when the second event is detected (Yes in S206), the event detection unit 12 outputs a flag indicating that the second event is detected to the alert unit 13.

When receiving the flag indicating that the second event is detected, the alert unit 13 notifies the second alert (S207).

Thus, the operation of the monitoring device 20 according to the present second example embodiment ends.

Effects of Present Example Embodiment

According to the configuration of the present example embodiment, the video acquisition unit 21 acquires video data. The event detection unit 12 detects an event from the video data. The alert unit 13 notifies a first alert when a first event is detected, and notifies a second alert that is distinguished from the first alert when a second event associated with the first event is further detected in addition to the first event.

That is, the monitoring device 20 notifies alerts that are distinguished from each other between a case where the first event is detected and a case where the second event is also detected in addition to the first event. In other words, the monitoring device 20 notifies different alerts in two stages when the first event is detected and when the second event is detected. As a result, it is possible to prompt the monitoring person to respond to the event.

Furthermore, according to the configuration of the present example embodiment, the event detection unit 12 receives the analysis result of the video data from the camera 90, and determines whether the first event is detected based on the analysis result of the video data.

Therefore, the monitoring device 20 can reduce a load of the processing of detecting the first event. Further, the monitoring device 20 can efficiently detect the second event from the video data obtained within the period during which the first event is detected.

Third Example Embodiment

A third example embodiment will be described with reference to FIGS. 7 and 8. The components described in the present third example embodiment, the components denoted by the same member numbers as those of the components described in the first or second example embodiment have the same functions as those of the components described in the first or second example embodiment.

(Monitoring Device 30)

A configuration of the monitoring device 30 according to the present third example embodiment will be described with reference to FIG. 7. FIG. 7 is a block diagram illustrating a configuration of the monitoring device 30.

Figure 7:
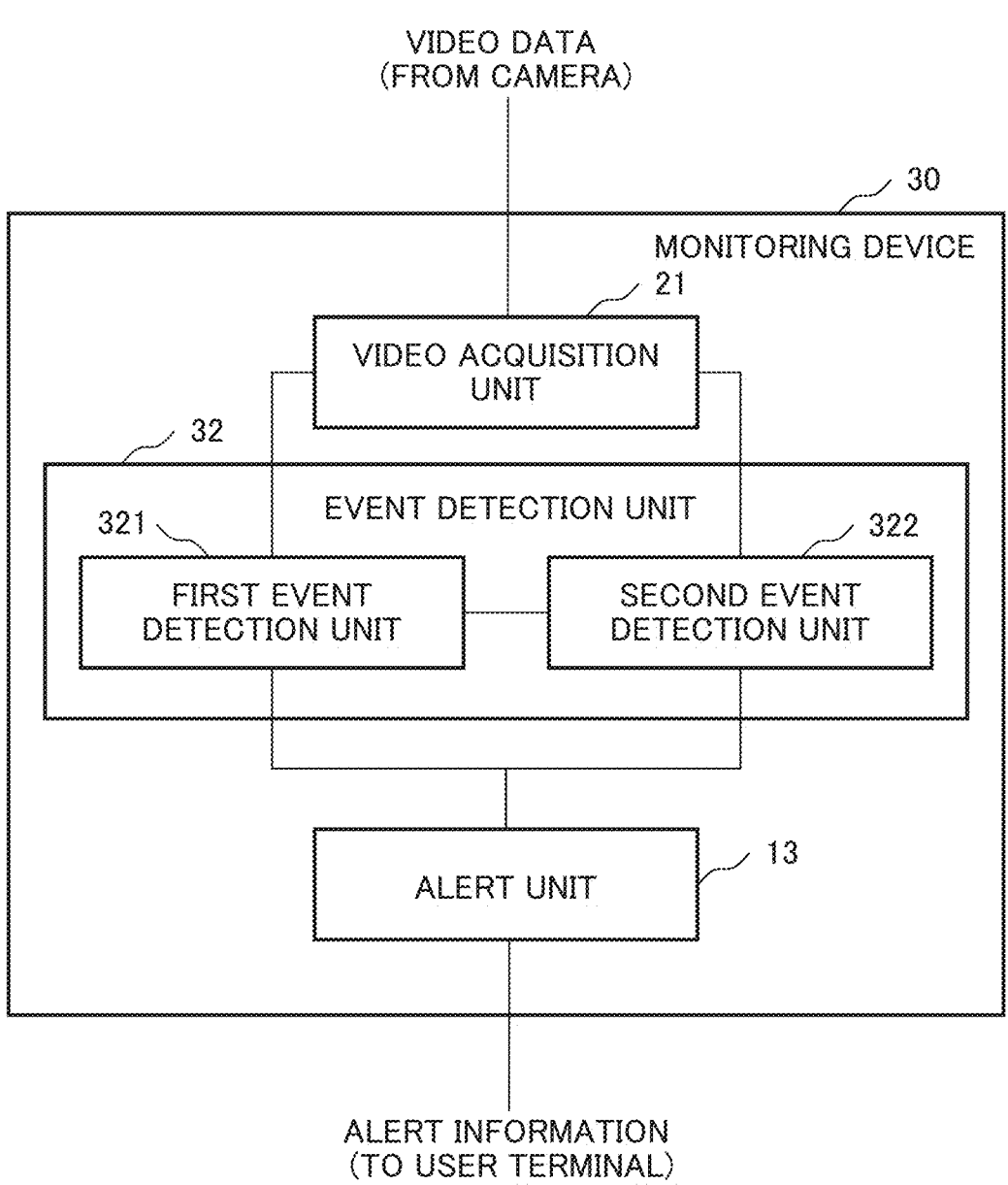
FIG. 7 is a block diagram illustrating a configuration of a monitoring device according to a third example embodiment.

As illustrated in FIG. 7, the monitoring device 30 includes a video acquisition unit 21, an event detection unit 32, and an alert unit 13. The event detection unit 32 according to the present third example embodiment detects an event from video data. The event detection unit 32 is an example of an event detection means. The event detection unit 32 is different from the event detection unit 12 described in the first or second example embodiment in including a first event detection unit 321 and a second event detection unit 322. The event detection unit 32 may further include a third event detection unit (not illustrated) that detects a third event associated with the first event and the second event from the video data when the second event is detected.

The first event detection unit 321 detects a first event from the video data. The first event detection unit 321 is an example of a first event detection means. In one example, the first event detection unit 321 detects the first event from the video data by using a learned identifier that identifies an object or a motion related to the first event. Alternatively, the first event detection unit 321 may detect the first event by using a technique for detecting an object by the background difference method and a technique for determining an attribute of an object (such as a type or a posture of an object) by pattern matching. However, the means and methods for detecting the first event are not limited.

The second event detection unit 322 detects the second event from the video data. The second event detection unit 322 is an example of a second event detection means. In one example, the second event detection unit 322 detects a second event from the video data by using a learned identifier that identifies an object or a motion related to the second event. Alternatively, similarly to the first event detection unit 321, the second event detection unit 322 may use related techniques such as a background difference method and pattern matching. However, the means and methods for detecting the second event are not limited.

(Operation of Monitoring Device 30)

Figure 8:
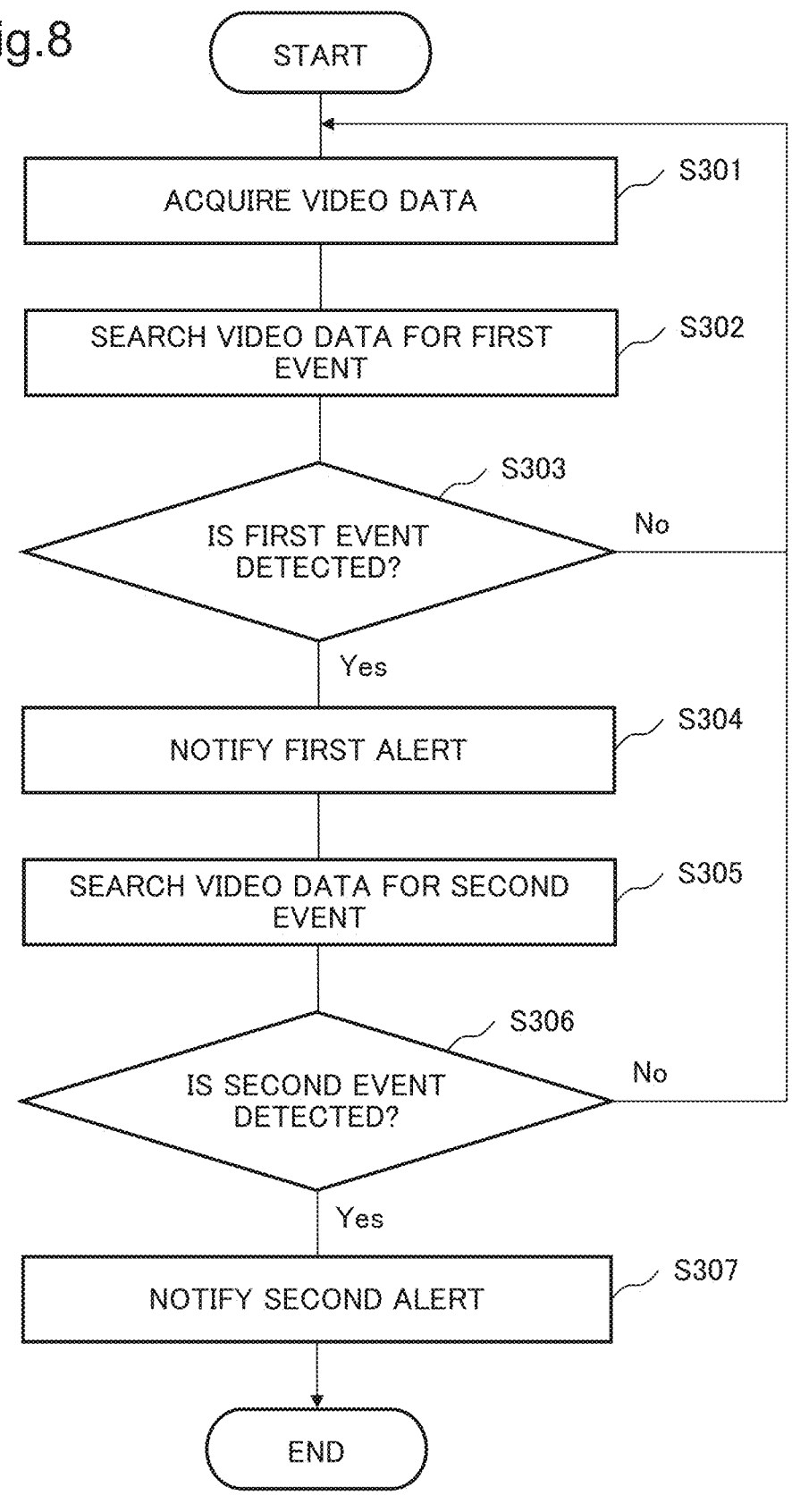
FIG. 8 is a flowchart illustrating a flow of processing executed by each unit of a monitoring device according to a third example embodiment.

FIG. 8 is a flowchart illustrating a flow of processing executed by each unit of the monitoring device 30 according to the present third example embodiment.

As illustrated in FIG. 8, first, the video acquisition unit 21 acquires video data (S301). The video acquisition unit 21 outputs the acquired video data to each of the first event detection unit 321 and the second event detection unit 322 of the event detection unit 32.

The first event detection unit 321 receives the video data from the video acquisition unit 21. The first event detection unit 321 searches the received video data for the first event (S302).

When the first event is not detected from the video data (No in S303), the flow returns to step S301. On the other hand, when the first event is detected from the video data (Yes in S303), the first event detection unit 321 outputs a flag indicating that the first event is detected to the second event detection unit 322 and the alert unit 13.

When the flag indicating that the first event is detected is received from the first event detection unit 321, the alert unit 13 notifies the first alert (S304).

When the second event detection unit 322 receives the flag indicating that the first event is detected from the first event detection unit 321, the second event detection unit 322 receives the video data from the video acquisition unit 21. The second event detection unit 322 searches the received video data for the second event (S305).

When the second event is not detected from the video data (No in S306), the flow returns to step S301. On the other hand, when the second event is detected from the video data (Yes in S306), the second event detection unit 322 outputs a flag indicating that the second event is detected to the alert unit 13.

When the flag indicating that the second event is detected is received from the second event detection unit 322, the alert unit 13 notifies the second alert (S307).

Thus, the operation of the monitoring device 30 according to the present third example embodiment ends.

Effects of Present Example Embodiment

According to the configuration of the present example embodiment, the video acquisition unit 21 acquires video data. The event detection unit 32 detects an event from the video data. The alert unit 13 notifies a first alert when a first event is detected, and notifies a second alert that is distinguished from the first alert when a second event associated with the first event is further detected in addition to the first event.

That is, the monitoring device 30 notifies alerts that are distinguished from each other between a case where only the first event is detected and a case where the second event is also detected in addition to the first event. In other words, the monitoring device 30 notifies different alerts in two stages when the first event is detected and when the second event is detected. As a result, it is possible to prompt the monitoring person to respond to the event.

Further, according to the configuration of the present example embodiment, the event detection unit 32 includes the first event detection unit 321 that detects the first event from the video data and the second event detection unit 322 that detects the second event from the video data. Therefore, the monitoring device 30 does not need to obtain the detection result of the first event from the camera 90. In other words, it can also be said that the monitoring device 30 has a function as the analysis unit of the camera 90 described in the second example embodiment.

Fourth Example Embodiment

A fourth example embodiment will be described with reference to FIGS. 9 and 10. Among the components described in the present fourth example embodiment, the components denoted by the same member numbers as those of the components described in any of the first to third example embodiments have the same functions as those of the components described in any of the first to third example embodiments.

In the present fourth example embodiment, an example of a method of associating a first event with a second event will be described. For example, when the second event is considered to be a result of a "traffic accident", the first event may have various causes (factors) such as "signal neglect", "overspeed", "distracted driving", and "meandering driving". Alternatively, when the second event is considered to be a cause of a "traffic accident", the first event may have various results such as a "change in vehicle body shape", a "fallen person", and a "traffic jam".

In the present fourth example embodiment, there may be a plurality of first events associated with the same second event. Hereinafter, as an example, a case where the first event is the cause and the second event is the result will be described.

(Monitoring Device 40)

A configuration of the monitoring device 40 according to the present fourth example embodiment will be described with reference to FIG. 9. FIG. 9 is a block diagram illustrating a configuration of the monitoring device 40.

Figure 9:
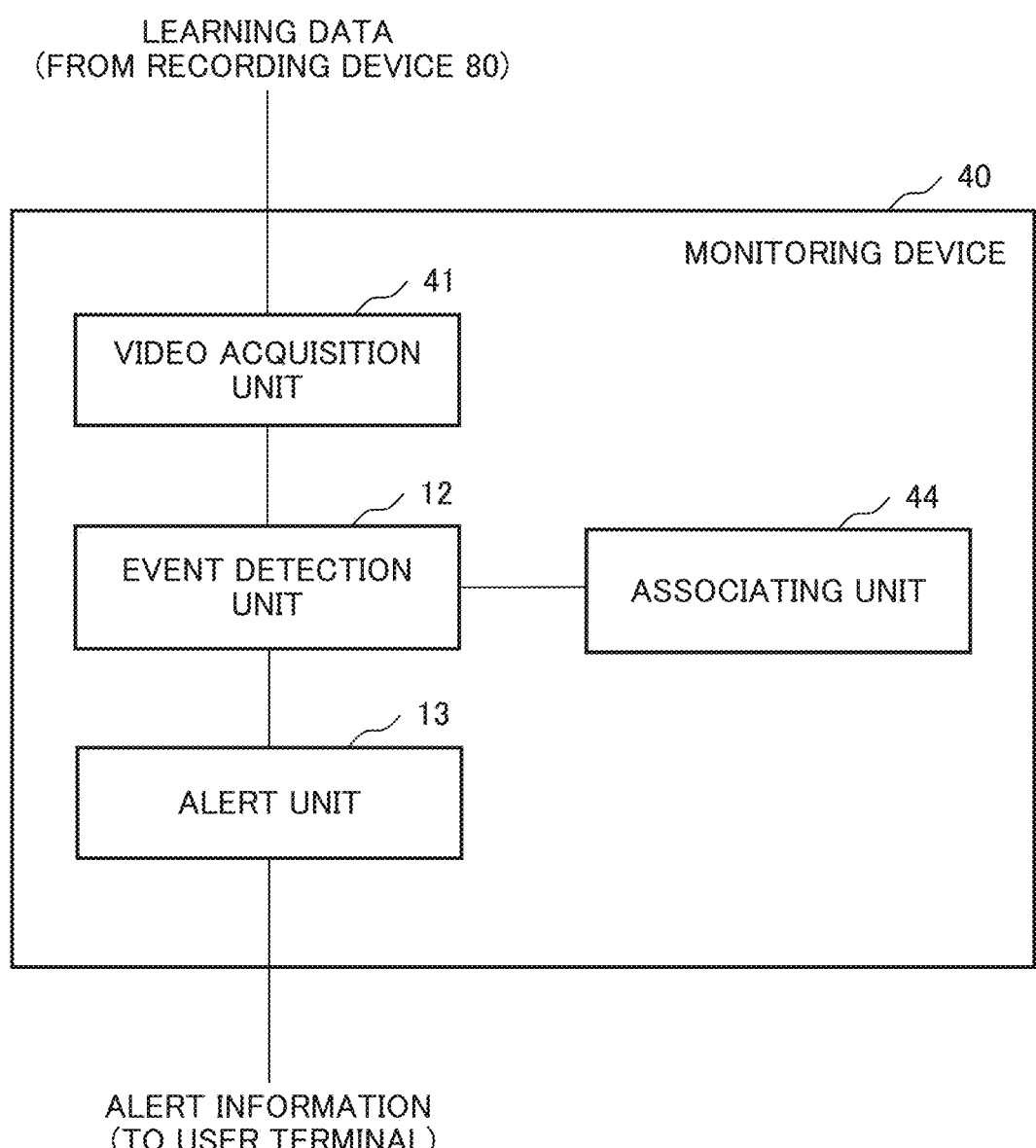
FIG. 9 is a block diagram illustrating a configuration of a monitoring device according to a fourth example embodiment.

As illustrated in FIG. 9, the monitoring device 40 includes a video acquisition unit 41, an event detection unit 12, and an alert unit 13. The monitoring device 40 according to the present fourth example embodiment further includes an associating unit 44.

The associating unit 44 associates the first event with the second event. The associating unit 44 is an example of an associating means.

Specifically, the associating unit 44 acquires a large number of pieces of video data as learning data. In the present fourth example embodiment, the second event is predetermined as a trigger of the second alert. The associating unit 44 associates the first event with the second event based on a result of learning candidates for the first event occurring before or after the second event by using the learning data. Hereinafter, as an example, a case where a candidate of a first event chronologically preceding the second event is associated with the second event will be described.

Figure 10:
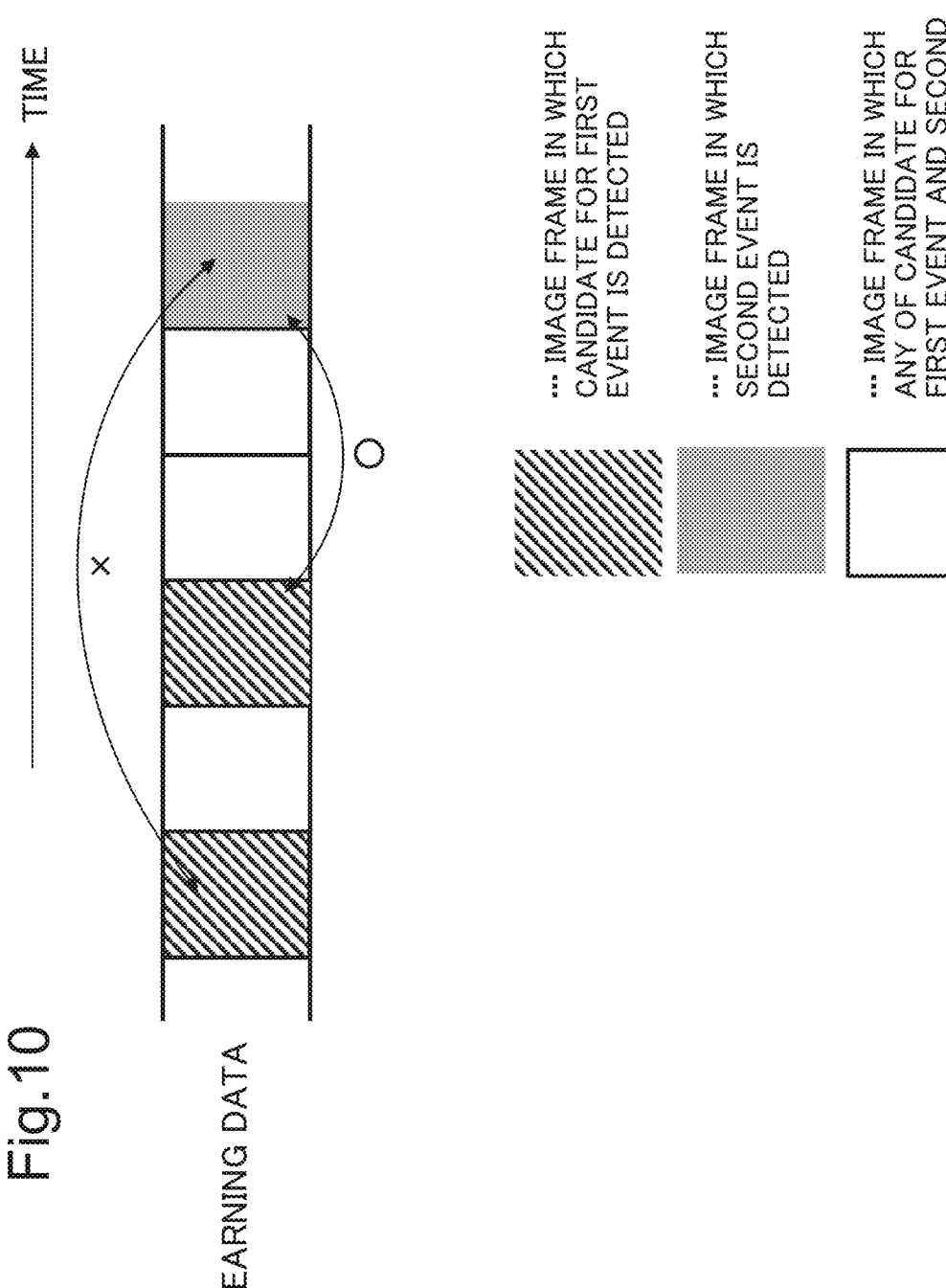
FIG. 10 illustrates an example of association between a second event in learning data and two candidates for a first event.

FIG. 10 is a diagram illustrating an example of association between the second event and the candidate for the first event in the learning data. As illustrated in FIG. 10, as the time at which the candidate for the first event is detected becomes farther in a direction of the past from the time at which the second event is detected, a relevance between the candidate for the first event and the second event becomes smaller. Therefore, the associating unit 44 associates, in the learning data, only the candidate for the first event detected from the video data within a certain period in the direction of the past from the time when the second event is detected with the second event.

The associating unit 44 calculates a score (an example of the degree of relevance) for the candidate for the first event associated with the second event as described above. In one example, the associating unit 44 calculates the score of the candidate for the first event based on how many pieces of learning data the candidate for the first event is detected in the acquired video data.

The associating unit 44 determines a first event from one or more candidates by using the score calculated as described above, and associates the first event with the second event. For example, the associating unit 44 associates one or more candidates of which scores exceed a threshold with a second event as a first event.

The associating unit 44 outputs information indicating association between the first event and the second event to the event detection unit 12. As described in the third example embodiment, the event detection unit 12 detects the first event associated with the second event based on the information received from the associating unit 44. Alternatively, as described in the second example embodiment, the event detection unit 12 may determine whether the event detected by the camera 90 is the first event based on the information received from the associating unit 44.

(Operation of Monitoring Device 40)

Figure 11:
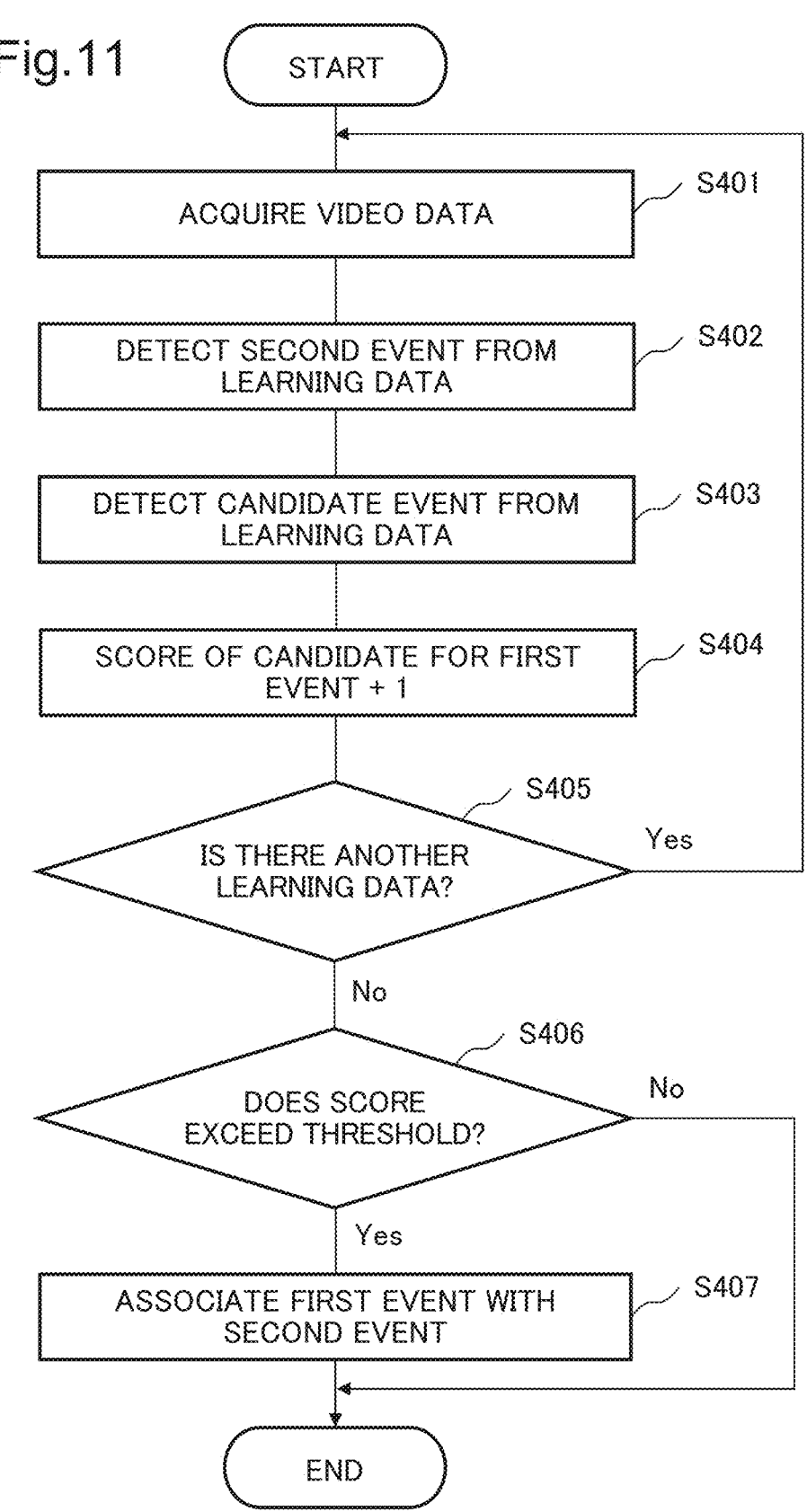
FIG. 11 is a flowchart illustrating a flow of processing executed by each unit of a monitoring device according to a fourth example embodiment.

FIG. 11 is a flowchart illustrating a flow of processing executed by the monitoring device 40 according to the present fourth example embodiment.

As illustrated in FIG. 11, first, the video acquisition unit 41 acquires learning data (S401). In one example, the video acquisition unit 41 is stored in the recording device 80. The video acquisition unit 41 acquires the learning data from the recording device 80 via the network 70. The video acquisition unit 41 outputs the acquired learning data to the event detection unit 12.

The event detection unit 12 receives the learning data from the video acquisition unit 41. The event detection unit 12 detects the second event from the learning data (S402). The event detection unit 12 outputs a flag indicating that the second event is detected in the learning data to the associating unit 44.

The event detection unit 12 detects a candidate for the first event from the learning data (S403). The event detection unit 12 outputs a flag indicating that the candidate for the first event is detected in the learning data to the associating unit 44.

The associating unit 44 receives a flag indicating that the second event is detected and a flag indicating that a candidate for the first event is detected from the event detection unit 12. In this case, the associating unit 44 increases the score of the candidate for the first event by one (S404).

When there is another learning data (Yes in S405), the flow returns to step S401. On the other hand, when there is no other learning data (No in S405), the flow proceeds to step S406.

The associating unit 44 determines whether the score for the candidate for the first event exceeds a threshold (S406).

When the score does not exceed the threshold (No in S406), the associating unit 44 does not associate the candidate for the first event with the second event as the first event, and the flow ends. On the other hand, when the score for the candidate for the first event exceeds the threshold (Yes in S406), the associating unit 44 associates the candidate for the first event with the second event as the first event (S407). Thereafter, the associating unit 44 outputs information indicating the association between the first event and the second event to the event detection unit 12.

The event detection unit 12 detects the first event from the video data by using the information received from the associating unit 44 as described in the first or third example embodiment. Alternatively, as described in the second example embodiment, the event detection unit 12 searches for the first event from among the events detected by the camera 90.

The alert unit 13 according to the present fourth example embodiment may change the aspect of the first alert according to the degree of relevance between the first event and the second event. In one example, the alert unit 13 makes the first alert more conspicuous as the above-described score (an example of the degree of relevance) for the first event is higher. This is because the higher the score between the first event and the second event, the more likely the second event (that is, the event that the monitoring person should respond to) will be detected after the first event is detected.

As described above, the operation of the monitoring device 40 according to the present fourth example embodiment ends. When the event detection unit 12 detects a plurality of candidates for the first event from the learning data, the monitoring device 40 executes the above-described processing for each of the candidates for the first event. As a result, a plurality of candidates for the first event may be associated with the second event as the first event.

Effects of Present Example Embodiment

According to the configuration of the present example embodiment, the video acquisition unit 41 acquires video data. The event detection unit 12 detects an event from the video data. The alert unit 13 notifies a first alert when a first event is detected, and notifies a second alert that is distinguished from the first alert when a second event associated with the first event is further detected in addition to the first event.

That is, the monitoring device 40 notifies alerts that are distinguished from each other between a case where only the first event is detected and a case where the second event is also detected in addition to the first event. In other words, the monitoring device 40 notifies different alerts in two stages when the first event is detected and when the second event is detected. As a result, it is possible to prompt the monitoring person to respond to the event.

Furthermore, according to the configuration of the present example embodiment, the monitoring device 40 further includes the associating unit 44 that associates the first event with the second event. In one example, the associating unit 44 calculates the degree of relevance based on a result of learning the candidate for the first event as the cause of the second event by using the video data, and associates the candidate for the first event having the degree of relevance with the second event exceeding the threshold with the second event as the first event. As a result, even when the first event and the second event are not associated in advance, the first event and the second event can be associated with each other based on the learning data.

Other Example Embodiments

The configuration described in the present example embodiment can be applied to any of the first to fourth example embodiment described above.

The alert unit 13 according to the present example embodiment changes the aspect of the first alert or the second alert according to the time when the first event or the second event is detected.

In one example, the first alert and the second alert are sound. In this case, the alert unit 13 changes the volume of the sound corresponding to the first alert or the sound corresponding to the second alert according to the time when the first event or the second event is detected. In particular, the alert unit 13 notifies the first alert or the second alert with a larger volume than during the day at night.

In other examples, the first alert and the second alert are display. In this case, the alert unit 13 changes the emphasis of the sound corresponding to the first alert or the display corresponding to the second alert according to the time when the first event or the second event is detected. In particular, the alert unit 13 notifies the first alert or the second alert with stronger emphasis than during the day at night.

Effects of Present Example Embodiment

According to the configuration of the present example embodiment, the alert unit 13 changes the aspect of the first alert or the second alert according to the time when the first event or the second event is detected. As a result, the monitoring person can take an appropriate response based on the aspect of the first alert or the second alert. For example, when the first alert is notified at night, the monitoring person performs monitoring more carefully than when the first alert is notified during the day.

[Hardware Configuration]

Figure 12:
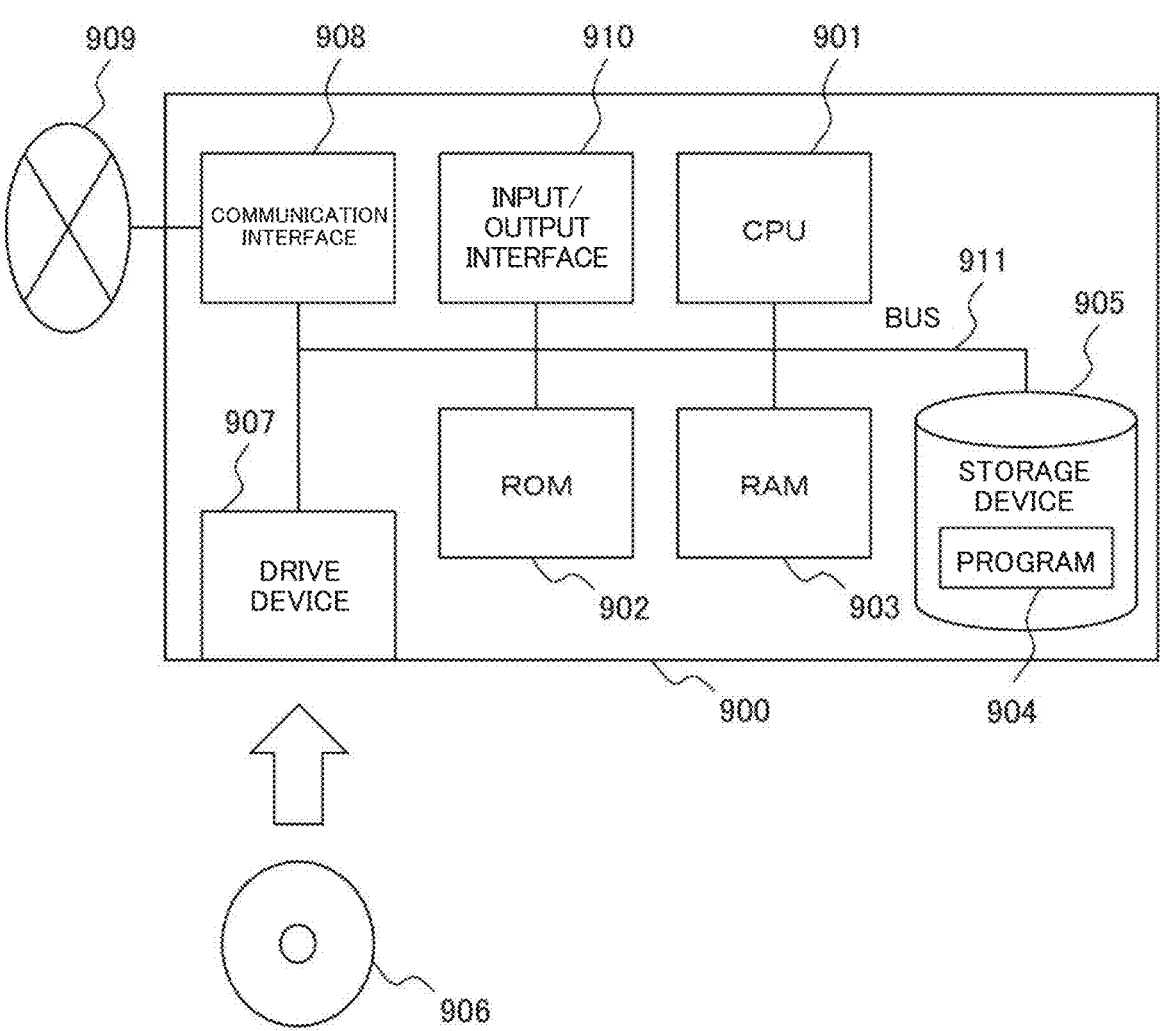
FIG. 12 is a diagram illustrating a hardware configuration of a monitoring device according to any one of first to fourth example embodiments.

Each component of the monitoring devices 10 to 40 described in the first to fourth example embodiments indicates a functional unit block. Some or all of these components are implemented by an information processing device 900 as illustrated in FIG. 12, for example. FIG. 12 is a block diagram illustrating an example of a hardware configuration of the information processing device 900.

As illustrated in FIG. 12, the information processing device 900 includes the following configuration as an example.

CPU(Central Processing Unit)901
ROM(Read Only Memory)902
RAM(Random Access Memory)903
Program 904 loaded into the RAM 903
Storage device 905 that stores the program 904
Drive device 907 that reads and writes a recording medium 906
Communication interface 908 coupled to a communication network 909
Input/output interface 910 for inputting/outputting data
Bus 911 coupling each component Each component of the monitoring devices 10 to 40 described in the first to fourth example embodiments is implemented by the CPU 901 reading and executing the program 904 that implements these functions. The program 904 for achieving the function of each component is stored in the storage device 905 or the ROM 902 in advance, for example, and the CPU 901 loads the program into the RAM 903 and executes the program as necessary. The program 904 may be supplied to the CPU 901 via the communication network 909, or may be stored in advance in the recording medium 906, and the drive device 907 may read the program and supply the program to the CPU 901.

According to the above configuration, the monitoring devices 10 to 40 described in the first to fourth example embodiments is achieved as hardware. Therefore, effects similar to the effects described in the first to fourth example embodiments can be obtained.

Although the invention of the present application has been described with reference to the example embodiments (and examples), the invention of the present application is not limited to the above example embodiments (and examples). Various modifications that can be understood by those skilled in the art can be made to the configurations and details of the above example embodiments (and examples) within the scope of the invention of the present application.

APPENDIX

Note that some or all of the above-described example embodiments can also be described as the following Supplementary Notes, but are not limited to the following.

(Supplementary Note 1)

A monitoring device including:
an event detection means configured to detect an event from video data; and
an alert means configured to notify a first alert when a first event is detected and notify a second alert that is distinguished from the first alert when a second event associated with the first event is further detected in addition to the first event.

(Supplementary Note 2)

The monitoring device according to Supplementary Note 1,
in which the event detection means includes a first event detection means configured to detect the first event from the video data and a second event detection means configured to detect the second event from the video data.

(Supplementary Note 3)

The monitoring device according to Supplementary Note 1, further including a video acquisition means configured to acquire video data obtained by a camera photographing an image of a monitoring target area,
in which the event detection means detects the first event from among events detected by the camera from the video data.

(Supplementary Note 4)

The monitoring device according to Supplementary Note 3,
in which the event detection means acquires an analysis result of the video data from the camera, and extracts information indicating an event detected by the camera from the video data, from the analysis result of the video data.

(Supplementary Note 5)

The monitoring device according to any one of Supplementary Notes 1 to 4, further including:
an associating means configured to associate the first event with the second event.

(Supplementary Note 6)

The monitoring device according to Supplementary Note 5,
in which the associating means associates the first event with the second event based on a result of learning a candidate for the first event that occurs before the second event by using learning data.

(Supplementary Note 7)

The monitoring device according to any one of Supplementary Notes 1 to 6,
in which the alert means changes an aspect of the first alert or the second alert according to a time at which the first event or the second event is detected.

(Supplementary Note 8)

A monitoring method by a monitoring device, the method including:

detecting an event from video data; and notifying a first alert when a first event is detected, and notifying a second alert that is distinguished from the first alert when a second event associated with the first event is further detected in addition to the first event.

(Supplementary Note 9)

A non-transitory recording medium that stores a program for causing a computer to execute:

detecting an event from video data; and notifying a first alert when a first event is detected, and notifying a second alert that is distinguished from the first alert when a second event associated with the first event is further detected in addition to the first event.

REFERENCE SIGNS LIST

1 system

10 monitoring device

12 event detection unit

13 alert unit

20 monitoring device

21 video acquisition unit

30 monitoring device

32 event detection unit

321 first event detection unit

322 second event detection unit

40 monitoring device

41 video acquisition unit

44 associating unit

90 camera

The invention claimed is:

1. A Video processing apparatus comprising:

at least one memory storing instructions; and at least one processor configured to execute the instructions to:

determine whether a video includes an event indicating a predetermined action;

determine whether a video includes an event indicating a result;

control a display method of a search result on a display device, based on the determinations;

output information indicating a relationship in a case where a first event and a second event are associated; and search for a video regarding the first event and the second event in a case where the information indicating the relationship is provided, wherein the first event includes the event indicating the predetermined action, and wherein the second event includes the event indicating the result.

2. A Video processing method comprising:

determining whether a video includes an event indicating a predetermined action;

determining whether a video includes an event indicating a result;

controlling a display method of a search result on a display device, based on the determinations;

outputting information indicating a relationship in a case where a first event and a second event are associated; and searching for a video regarding the first event and the second event in a case where the information indicating the relationship is provided, wherein the first event includes the event indicating the predetermined action, and wherein the second event includes the event indicating the result.

3. The video processing system according to claim 1, wherein the at least one processor is further configured to execute the instructions to control a color of the search result.

4. The video processing system according to claim 1, further comprising a storage, wherein the storage is configured to store the video, and the video is associated with metadata.

5. The video processing method according to claim 2, further comprising controlling a color of the search result.

6. The video processing method according to claim 2, further comprising storing the video, the video being associated with metadata.

* * * * *